(12) United States Patent
Jensen

(10) Patent No.: US 6,325,176 B1
(45) Date of Patent: Dec. 4, 2001

(54) CONTROL UNIT OF LOADING PLATFORM SYSTEM

(75) Inventor: Jens Herman Jensen, Ulfborg (DK)

(73) Assignee: Sörensen Hydraulik Zweigniederlossung Ulfborg Filial af Sörensen Hydraulik GmbH Tyskland (DK)

( * ) Notice: Subject to any disclaimer, the term of this patent is extended or adjusted under 35 U.S.C. 154(b) by 0 days.

(21) Appl. No.: 09/501,367

(22) Filed: Feb. 10, 2000

(51) Int. Cl.$^7$ .................................................. B66F 9/06
(52) U.S. Cl. .................................... 187/222; 127/391
(58) Field of Search .................................. 127/203, 222, 127/223, 224, 227, 236, 238, 391; 419/592, 610, 629, 631, 632, 636, 641, 642

(56) References Cited

U.S. PATENT DOCUMENTS

| | | | |
|---|---|---|---|
| 3,993,166 | * | 11/1976 | Senour .................................. 187/9 R |
| 4,130,183 | * | 12/1978 | Tjornemark .......................... 187/9 R |
| 4,265,337 | * | 5/1981 | Dammeyer ............................ 187/9 E |
| 4,411,582 | * | 10/1983 | Nakada ................................. 414/636 |
| 4,598,797 | * | 7/1986 | Schultz ................................. 187/9 E |
| 4,942,529 | * | 7/1990 | Avitan et al. ......................... 414/636 |
| 5,740,887 | * | 4/1998 | Unger et al. .......................... 187/231 |
| 6,092,976 | * | 7/2000 | Kamiya ................................. 414/620 |
| 6,138,795 | * | 10/2000 | Kamiya ................................. 187/223 |

* cited by examiner

*Primary Examiner*—Jonathan Salata
(74) *Attorney, Agent, or Firm*—Klaus J. Bach

(57) ABSTRACT

In a control unit for the manually operable control of the lifting and lowering and/or upward tilting in a vertical position and the back-tilting of a loading platform of a loading platform system, which can be mounted on vehicles, particularly trucks, and which includes an electromechanical and/or electronic control circuit, a first light for characterizing an operating condition of the loading platform system is provided, wherein the control circuit is so designed, that, if after initiation of the operation of the loading platform system, the first light lights up, the supply voltage of the loading platform system is indicated to be at least sufficiently high for proper operation of the loading platform system.

10 Claims, 3 Drawing Sheets

CONTROL UNIT OF LOADING PLATFORM SYSTEM

BACKGROUND OF THE INVENTION

The invention relates to a control unit for controlling the lifting or lowering of a loading platform and/or the pivoting thereof to a vertical position and the back-pivoting of the loading platform to a horizontal position of a loading platform system mounted on vehicles particularly on trucks, which system includes an electromechanical and/or electronic control circuit.

Loading platform systems have been known in various forms for many years. These loading platform systems always include at least one lifting actuator which provides for the lifting and lowering of the platform. In certain embodiments of loading platform systems, which also close a loading bed of a truck, the lifting actuator also includes a pivot actuation arrangement by which the loading platform can be pivoted from a horizontal position in which the lifting and lowering of a load is effected, to the vertical position for closing a loading bed of a vehicle during transport of the load. At the destination, the loading platform is then again pivoted back from the vertical position to a horizontal working position for lifting and lowering the loading platform for performing its functions for which the loading platform is designed.

Other loading platform systems without the need for pivoting the loading platform from a horizontal to a vertical position and vice-versa are the so-called folding loading platforms which, at the end of a lowering or lifting procedure, are folded and pivoted or otherwise moved under the loading bed at the rear end of a vehicle.

The lifting activators and, under certain conditions if needed and available, also the folding actuators of such loading platform systems are generally operated by hydraulic or pneumatically actuated piston cylinder systems, but also lifting actuators and pivot actuators of electromechanical design or respectively, electromechanically operated actuators may be employed.

The control for the operation of the loading platform systems, that is, their lifting, the lowering, the pivoting with their front edge onto a street or similar, the pivoting from the horizontal to the vertical position of the loading platform and vice versa, that is, all the functions, which the loading platform of the loading platform system can perform during its design operation, are essentially initiated or respectively, terminated by a central control unit which is generally mounted on a vehicle in the rear near the loading platform system and which makes it possible for the operator to control the operation by manually actuating switch arrangements on the control unit.

Loading platform systems of the type generally also have, disposed on the platform itself, a plurality of switches, which can be operated by foot. These switches supply their signals to the control unit where they are processed and prepared so as to actuate the lifting and pivoting actuators corresponding to the control actions as desired by operator.

The control unit generally comprises an electromechanical and/or electronic control circuit, which processes the signals of manually operable switch arrangements or, respectively, functional elements and of the foot-operable switches and which supplies them for example to the lifting actuators and, if applicable, also to the tilting actuators in order to operate them. In summary, it may be said that the whole operation of the loading platform system is controlled and monitored by the control unit.

Some of such control units include optically visibly at least one indicating light which however indicates to the operator only that the loading platform system is switched on.

It does not need to be pointed out that such loading platform systems on vehicles are subjected during their normal operation, to rough treatment caused by weather and also by handling. In traffic, such influences are, for example, moisture from snow, mist, dust and other soilings, carbon suds and exhaust gases from motor vehicles, but also detrimental influences by inappropriate treatment of the control unit by the operator. Up to now, if the control unit failed as a result of such influences, failures in the loading platform system, particularly the control system, could be determined by relatively simple measures by measuring, for example, the signals and voltages and currents, and faulty components could then be rapidly replaced. In this way, however, the basic problems that cause the failure could not be eliminated. So, it was decided to encapsulate the whole mechanical and/or electronic control system in the control unit in plastic. This technique of course has the advantage that the external conditions described earlier no longer influence directly the control circuit with the switch elements. However, this technique also has the disadvantage that, upon occurrence of malfunctions in the platform loading system, the encapsulated electromechanical and/or electronic control unit does not permit identification of faulty components by measuring procedures and subsequent replacement of faulty components in the control unit or corresponding functional elements of the loading platform system. The advantage of encapsulating the control circuit in plastic therefore has the disadvantage as described above, which is not acceptable for safety and expense reasons, since now, the whole control unit must be removed and replaced by a new unit when a malfunctioning is noticed. The situation is not acceptable for safety reasons since the likelihood of an accident is substantially increased if the operator assumes that the loading platform system including the control unit is operative, but this is actually not the case because a fault in the system cannot be recognized.

It is the object of the present invention to provide a control system for a loading platform, which, even for control units which are partially or fully encapsulated in plastic, provides a minimum of information concerning the state of operation of the loading platform system to the operator so that, based on the information obtained, the operator can start, continue, or discontinue operation of the loading platform system, or not initiate operation in the first place. The control unit should be relatively simple, reliable, and inexpensive.

SUMMARY OF THE INVENTION

In a control unit for the manually operable control of the lifting and lowering and/or upward tilting in a vertical position and the back-tilting of a loading platform of a loading platform system which can be mounted on vehicles, particularly trucks, and which includes an electromechanical and/or electronic control circuit, a first light means for characterizing an operating condition of the loading platform system is provided, wherein the control circuit is so designed, that if, after initiation of the operation of the loading platform system, the first light means lights up, the supply voltage of the loading platform system is indicated to be at least sufficiently high for proper operation of the loading platform system.

The advantage of the solution according to the invention resides essentially in that, with relatively simple means, the base function, or respectively, the base function prerequisite for the loading platform system is detected in that normal operation of the loading platform system is possible if the supply voltage for the loading platform system exceeds a predetermined lower threshold. It is pointed out that such loading platform systems are generally operated by the 12V, or respectively, 24V DC power supply of the vehicle and that, for the normal operation of the loading platform system, it is readily noticed whether the available voltage is sufficiently high. This is indicated in accordance with the invention in that both light means emit light, which means that the supply voltage exceeds a predetermined lower voltage threshold. Expensive and mechanically highly sensitive digital or analog voltage indicating devices are not required so that the control unit is, in accordance with the object, simple and inexpensive in design and, accordingly, can be manufactured in a simple and inexpensive manner.

It is advantageous to provide a second light means, wherein the control circuit is so designed that, when the loading platform system is in operation and the first as well as the second light means are lit up, the supply voltage for the loading platform system is indicated as being at least sufficient. With this measure, the security with which the supply voltage is determined and with which it is indicated whether it is above or below a predetermined threshold, is further increased. This is a further advantage in the normal overall operation of the loading platform system.

In an advantageous embodiment of the control unit the control circuit recognizes a state wherein all control and/or operating elements of the loading platform system are properly operating if one light means emits no light after the loading platform system has been placed in operation by actuating at least one switch for lifting or lowering the loading platform. In this way, the operator can recognize in a simple and elegant way that the loading platform is in good operational order.

In another advantageous embodiment, the control unit is so designed that, if a light means lights up after operation of the loading platform system has been initiated as a result of the activation of at least one switch for causing lifting or lowering of the loading platform, a condition is indicated, wherein at least one control and/or operating element of the loading platform system does not operate properly.

In that case, the operator of the loading platform system can immediately decide, whether he wants to start operation of the loading platform system, whether he discontinues operation or whether he continues operation if the malfunctioning element cannot recognized as such or if the operating elements detrimentally affected, whether, after evaluating the situation, he wants to continue operation with a limited operability at least to complete the started loading or unloading procedure.

Control and/or operating elements as referred to earlier may be electrical, electromechanical, electronic, mechanical, hydraulic and pneumatic elements as they are used generally in connection with loading platform systems. In an advantageous embodiment of the control unit, the control and/or operating element comprises at least one foot-operable switch. Foot-operable switches are arranged directly on the loading platform and represent a very important operating element for the intended operation of the loading platform system. Foot-operated switches are important for a safe operation not only for the loading platform system itself, but also for the operator of the loading platform system. By way of the foot-operated switches, the control unit can be activated for operating the loading platform, at least for raising or lowering the loading platform.

In accordance with another advantageous embodiment of the control unit, the first and/or second light means also serves for the illumination of operating instructions for the platform operating system arranged on the control unit so as to be visible from the outside by the operator. This additional illuminating function for the operating instructions eliminates the need for providing separate illumination devices, especially for the operating instructions when the platform loading system must be operated in accordance with the instructions for example in darkness or in twilight. As a result, the costs for the whole loading platform system are reduced. Also, the normally required separate voltage supply can be eliminated and no spare illuminating means, normally provided for an exchange in case of a defect, need to be provided.

Basically, the light means of the control unit may be any type of lights, for example, conventional incandescent lamps. However, in order to provide on one hand for the lowest possible current consumption and, on the other hand, to achieve a high mechanical stability and long life of the light means and yet a high light output, it is preferred if the light means is a light emitting diode (LED). For example, the two light means may be two different light emitting diodes emitting light that is different in color and/or intensity.

Below, the invention will be described in detail with reference to the following schematic drawings on the basis of a particular embodiment.

DESCRIPTION OF A PREFERRED EMBODIMENT

Figure 3:
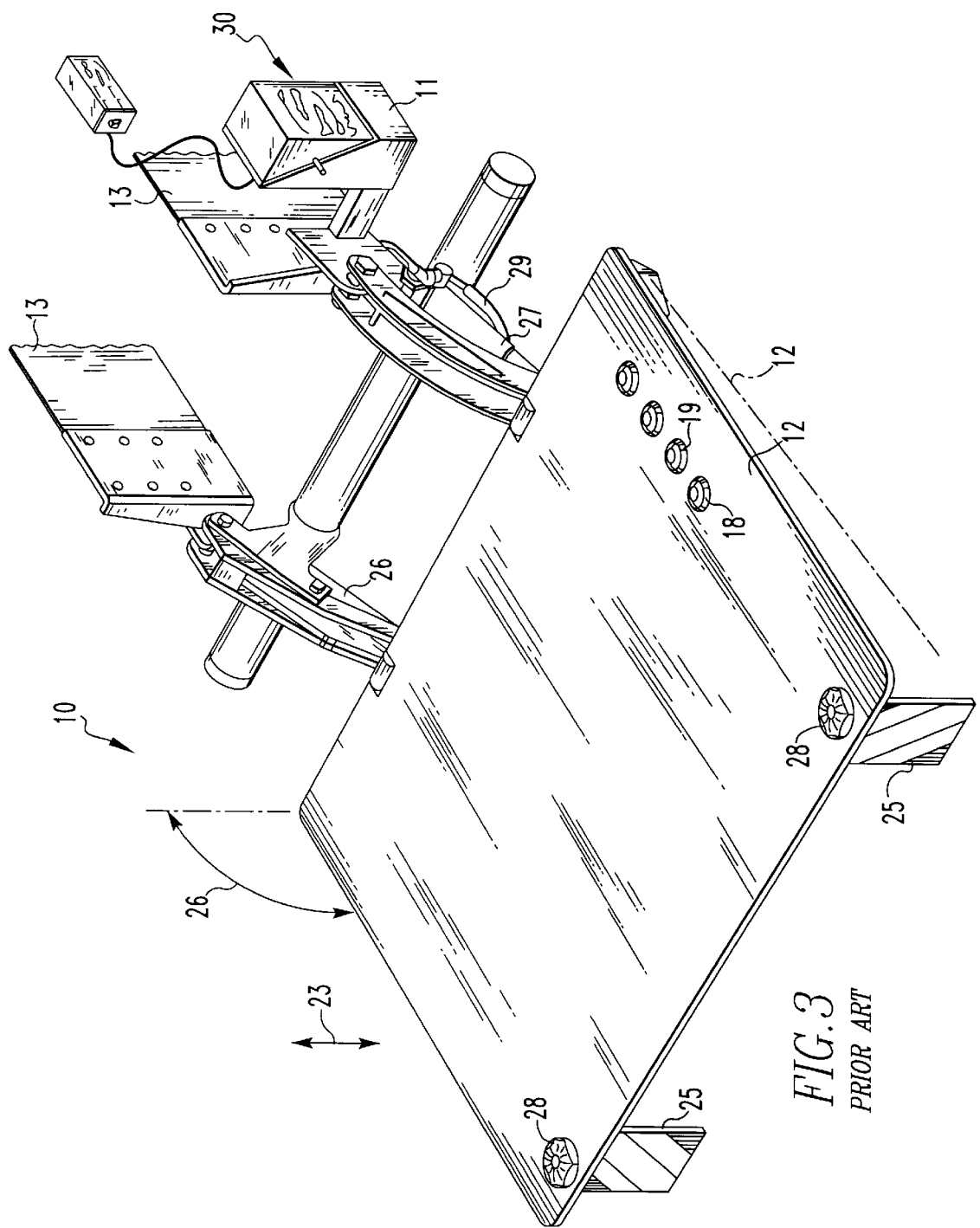
FIG. 3 is a perspective representation of an exemplary complete loading platform system in which, however, details which are not important for the understanding of the invention have been omitted.

First reference is made to FIG. 3, in which a conventional loading platform system 10 is shown. Conventional loading platform systems 10 are generally known so that their design and functioning is explained only shortly. A typical loading platform system is described for example in the EP-A-0 808 747 to which reference is made in this respect. In the loading platform system 10 disclosed therein only one lifting actuation mechanism 26 is provided for raising and lowering the loading platform 12 in a vertical direction, see arrow 23. A load, which is not shown, is to be raised for example from a street to a level corresponding to the loading bed of a vehicle 13 in order to transfer the load to the loading bed of the vehicle 13. Of the vehicle 13, only the frame members of a chassis are shown which is sufficient for an understanding of the loading platform system. With the tilt actuator mechanism 27 the loading platform 12 can be tilted from a horizontal position as shown in FIG. 3 to a vertical position, see arrow 24, in order for example to close the loading bed for a vehicle 13 or, vice versa, to open, that is to provide access to, the loading bed to permit the loading or unloading of loads. When the loading platform 12 is in a position lowered onto the ground, for example, on the surface of a street, the loading platform 12 can be slightly inclined, see the dash-dotted line with the reference numeral 12, so that the edge of the loading platform is disposed on the ground. The elastic warning flags 25 are then pivoted below the loading platform 12 so that they do not inhibit the downward tilting of the loading platform.

It is mentioned at this point that so-called folding loading board platform which can be folded into a suitable rear area between the loading bed and the chassis of a vehicle 13, do not require a tilt actuation arrangement 27 since pivot actuation as describe earlier is not required for this type of loading platform system 10. In the loading platform system 10 as disclosed in FIG. 3, the lift actuator arrangement 26 and the pivot actuator arrangement 27 are in communication with a valve block and hydraulic fluid tank (not shown) by way of hydraulic conduits 29—in FIG. 3 only the hydraulic conduit is symbolically shown. The hydraulic conduit has integrated therein a pump or several pumps, which are driven by way of an electric motor or several electric motors, also not shown, in order to provide the required pressure for the hydraulic medium.

On the vehicle, a control unit 11 is provided which, disposed in a housing 30, includes an electromechanical and/or electronic control circuit having control elements such as relays, switches, resistors, diodes, fuses, etc., and which are interconnected in a manner known in the field so that the standard movements of a loading platform 12 such as raising and lowering in a vertical direction as indicated by the arrow 23 and the pivoting from a vertical to a horizontal position and vice versa in accordance with the arrow 24 can be effected by the lift, or respectively, tilt actuators 26, 27 actuated by hydraulic media. To this end, the control unit 11 includes two control levers 21, 22 by which the movements of the loading platform 12 as described earlier can be controlled by an operator. This kind of control, which in the embodiment shown herein is, because of legal requirements, a so-called two-hand control arrangement, is basically known to the experts in the field so that a detailed description is not necessary. The control unit 11 (see FIGS. 1 and 2) includes a first and a second light means 15, 16 in such a way that the light means 15, 16 are visible from without the housing 30.

The control unit 10 is so designed that it is connected to the loading platform 12 by a suitable plug-in connection 31 with a suitable receptacle structure (not shown in detail). The plug—receptacle connection provides for an electrical connection with the two foot-operable switches 18, 19, which are arranged on the loading platform and for the connection with the warning lights 28, which are also arranged on the loading platform 12. The two remaining foot-operated switches which are shown on the loading platform 12 and which are not provided with reference numerals serve multi-foot — safety operating systems, which are not important for an explanation or understanding of the invention.

Figure 2:
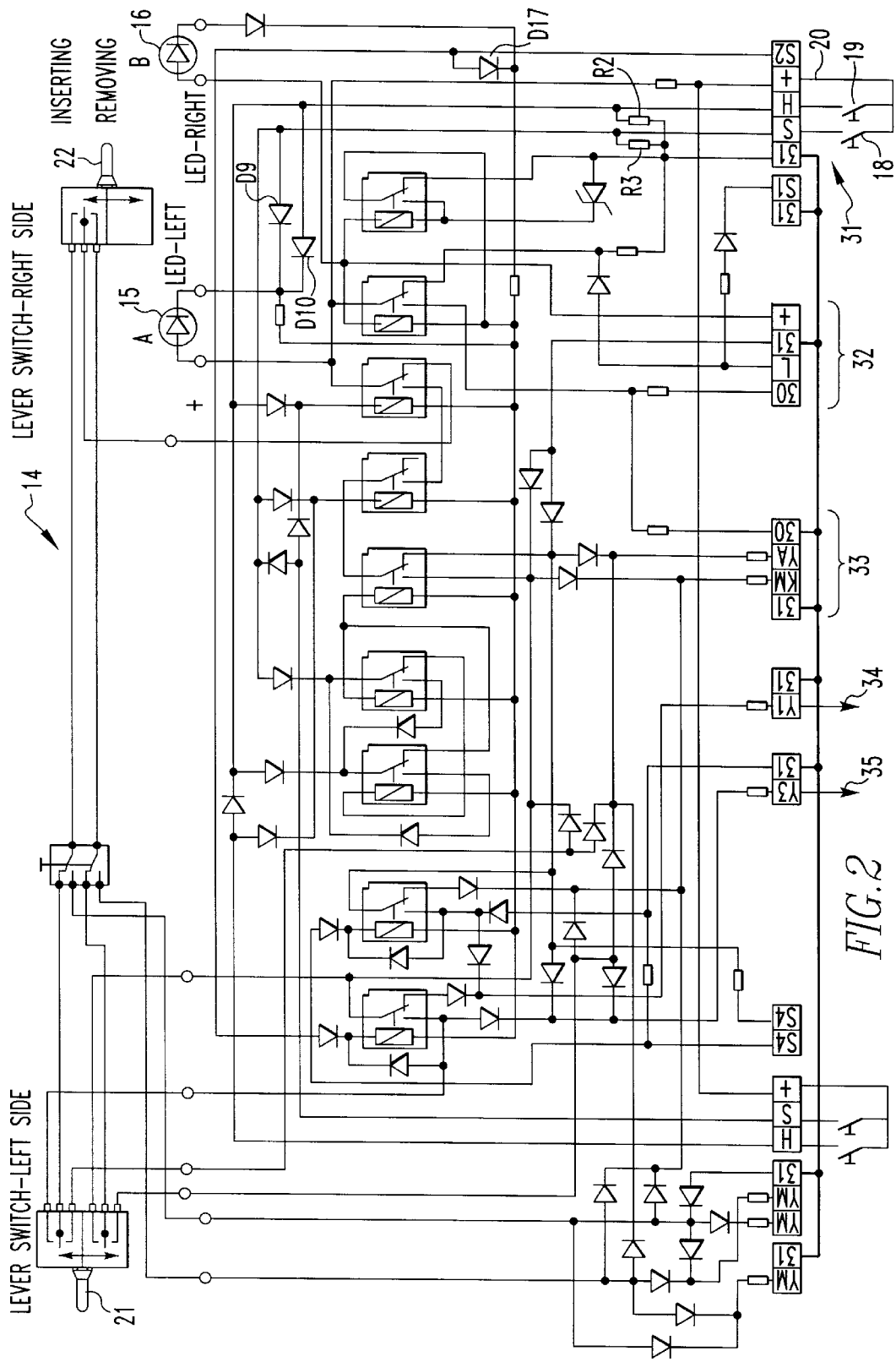
FIG. 2 shows as an electric circuit for controlling the loading platform system as it is included in the control unit.

The control circuit 14, shown in FIG. 2 in its entirety, for controlling the predetermined operation of all the functions of the loading platform system 10 will be described in detail only in as much as it is necessary for an understanding of the invention.

The loading platform system 10 is generally switched on from the driver's cabin of a vehicle 13. The electrical supply voltage of the power supply 13 is always 12V or respectively, 24V DC—other voltages are possible however — and is supplied to the control unit or respectively, the control circuit 24 by way of the plug-in connection 32. The control unit 11 is connected to the above mentioned electric motor or, respectively, motors for a hydraulic pump or for several hydraulic pumps and one or several valves so as to provide in the hydraulic lines the pressure required for the operation of the lifting actuator arrangement and, if applicable, also the tilt arrangement 27—see also the respective connections on the control unit or respectively, the control circuit 14 in FIG. 2.

The control circuit 14 is so designed that the two light means 15, 16 do not emit light when the loading platform system is not in operation. When the loading platform system 10 is switched on by the operator in the drivers cabin of the vehicle 13 by way of the plug-in connection 32, that is, an operating voltage (see above) is provided, the two light means are lit up. This indicates functionally that the supply voltage for the control unit 11 or, respectively, the loading platform system 10 is provided to the loading platform system in its entirety.

When both light means 15, 16 are lit up, this also means that the supply voltage is also present at the electric motor for driving the hydraulic pump and also at the valve or valves of the hydraulic system.

The control circuit 14 is so designed that, if, after proper operational start up of operation, the first light means does not light up, this is an indication that the supply voltage 17 of the loading platform system 10 is below a predetermined threshold or there is no supply voltage. When no light is emitted from the first light means 15, it is also indicated that a fuse of the control system 14, which is responsive to overload but resets itself, automatically (a so-called multi-fuse) has switched, that is, it has responded.

As far as the control circuit is concerned, this means that both light means 15, 16 are lit as long as a positive voltage is present at the anodes of the diodes D9 and D10 for the light means 15 and the diode D17 for the light means 16.

As soon as, after an orderly startup of the operation of the loading platform system and the orderly emission of light from the first and the second light means 15, 16, the loading platform 12 can be operated by the switch arrangements 21, 22 of the control unit 11. If the loading platform 12 is disposed in a well-known manner, for example, on a street surface so that an operator can step onto it, the foot-operated switch 18 is actuated for raising the platform or, if the loading platform is raised the foot-operated switch 19 is actuated whereby the loading platform 12 can be raised or lowered in accordance with the direction of the arrow 23. The foot-operable switches 18, 19 cooperate with the control circuit in such a way that, upon operation of one of the switches 18, 19 by way of the connection S or H, see FIG. 2, bottom right, a positive voltage is supplied to the anode of the diode D9 or, respectively, D10 by way of the resistors R2 and/or R3. One such voltage is sufficient to provide, at one pole of the light means 15, the same voltage potential as is on the other pole (24V or respectively, 12V DC voltage).

As a result, the first light means 15 does not emit any light. It is therefore possible to recognize whether the signal from the foot-operated switch or switches 18, 19 reach the control unit 11, or respectively, the control circuit 14. When the switch or switches 18, 19 are actuated and the first light means 15 is still lit, the switch or, respectively, switches 18, 19 is or are defective or the signal line by way of the plug-in connection 31 between the control circuit 14 and the switches 18, 19 of the loading platform is interrupted or the plug-in connection is defective.

The first and second light means 15, 16 have been described so far generally as light means, which emit light during operation as determined. The light means 15, 16 may therefore basically be normal incandescent lamps. The circuit 14 described herein however is so designed that the light means 15, 16 are light emitting diodes (LED) This means in the way as described earlier that the light means 15, 16 in the form of a light emitting diode will not emit any light if its cathode is at the same voltage potential as its anode. The light emitting diode as light means would then not be lit.

As already explained in the introductory part, the loading platform can still be tilted by a small angle, see dash-dotted sideline of the loading platform 12 in FIG. 3, so that the loading platform 12 is then disposed with its end edge on the road surface. The loading platform 12 is provided with a mercury switch (not shown). The control circuit functions in a way so as to prevent the raising of the loading platform 12 in this inclined position. Rather, the loading platform 12 must first be brought into a horizontal position before the raising function can be initiated by the control switches 21, 22 of the control unit 11. The same is true for the foot operated switches 18, 19. The mercury switch changes from the function "inclining" to the function "lifting". The respective signal provided by the mercury switch in the form of a positive voltage is supplied to the anode of the diode 17 and the light means 16, which is in the form of a light emitting diode (LED), which goes out. In this way, it can also be determined whether the mercury switch provided on the loading platform 12 is operative.

Figure 1:
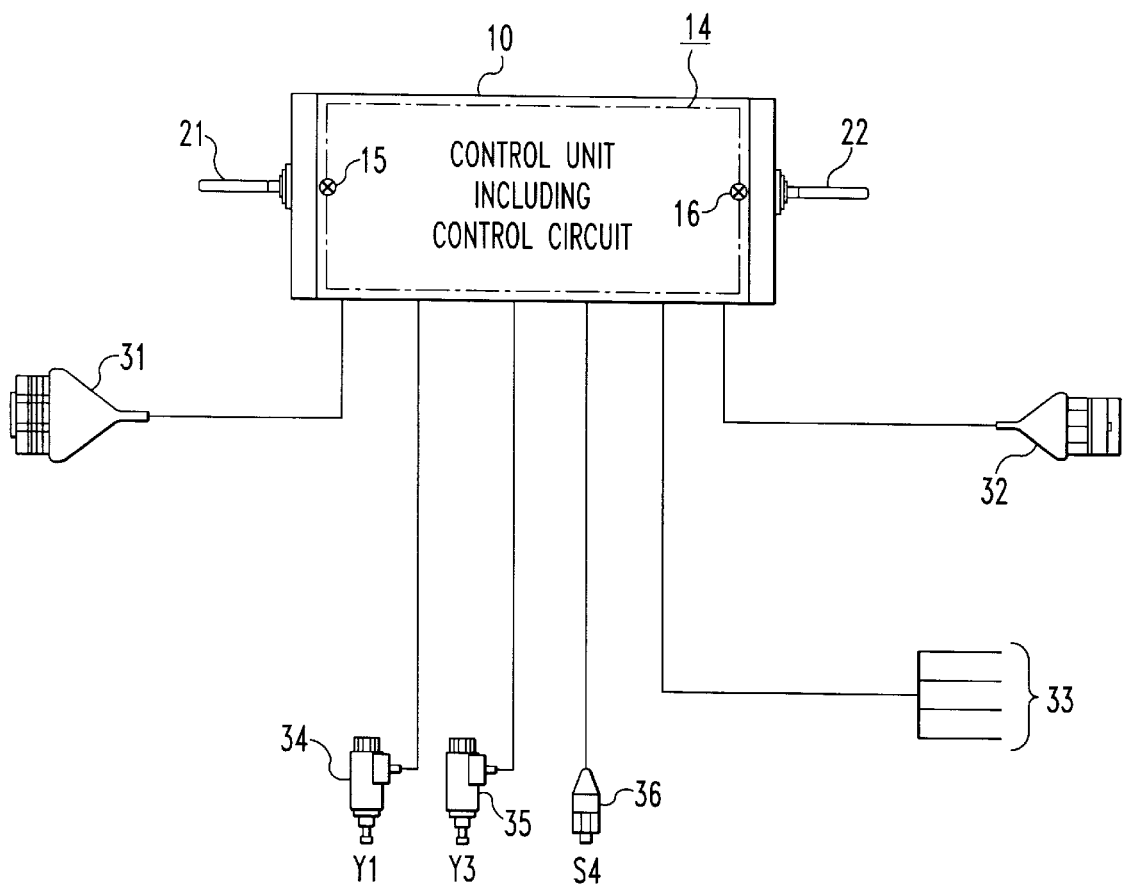
FIG. 1 shows a control unit of a loading platform system with connections to the various operating elements of the loading platform system in a block diagram.

For completeness and better understanding of the control for the loading platform system 10, it is pointed out that, see FIG. 1, the valves 34, 35, which are associated with the control unit 11 or, respectively, the control circuit 14, are the valves which control the flow of the hydraulic medium to the lift actuation mechanism 26 (valve 35) and if present to the tilt actuation mechanism 27 (valve 34) and the corresponding return flow. The pressure switch 36, which is also associated with the control unit 11 or, respectively, the control circuit 14 supplies a signal to the control circuit 14 when the loading platform 12 is disposed on the street surface so that tilting of the loading platform 12, see FIG. 3, can be only then initiated. The first and/or the second light means 15,16 which are visible from the operating side of the control unit 10 may also serve as illumination for operating instructions 20, see the dash-dotted line according to FIG. 1, which symbolically indicates the outline of possible operating instructions attached to the control unit 11.

What is claimed is:

1. A control unit for a manual or foot operable control for lifting or lowering the upward pivoting into vertical position and the backward pivoting of a loading platform into a horizontal position of a loading platform system for mounting on a vehicle, comprising: a control circuit, including a first light means for the characterization of an operating state of the loading platform system, said control circuit being so designed that, after startup of the operation of the loading platform system, said first light means is lit if the supply voltage of the loading platform system is sufficiently high for proper operation of the system, and that said first light means goes out following of the actuation of at least one switch for initiating the lifting or lowering of the loading platform to indicate a state in which all functional elements of the loading platform system are operational.

2. A control unit according to claim 1, wherein a second light means is provided and the control circuit is so designed that, after startup of the operation of the loading platform system, the supply voltage of the loading platform system is indicated to be sufficiently high if the first light means as well as the second light means are lit and both, said first and second light means go out if all elements of the loading platform system are operational after actuation of a switch for initiating the lifting or lowering of the loading platform.

3. A control unit according to claim 1, wherein the control unit is so designed that a state is indicated, wherein a functional element of the loading platform system is detrimentally affected in its functioning, when a light means lights up after start up of the loading platform system as a result of at least one switch being actuated for initiating the lifting or lowering of the loading platform.

4. A control unit according to claim 1, wherein said switch is at least one foot operated switch disposed on the loading platform.

5. A control unit according to claim 3, wherein said switch is at least one foot operated switch disposed on the loading platform.

6. A control unit according to claim 3, wherein said functional element comprises at least one of the foot operated switches.

7. A control unit according to claim 3, wherein said functional element is an electric, line of the loading platform system.

8. A control unit according to claim 2, wherein said light means also serves for the illumination of operating instructions for the loading platform disposed on the control unit.

9. A control unit according to claim 1, wherein said light means is an incandescent lamp.

10. A control unit according to claim 1, wherein said light means is a light emitting diode (LED).

* * * * *